(No Model.)

F. F. ATKINSON.
ADJUSTABLE FEED BAG.

No. 485,600. Patented Nov. 8, 1892.

Attest:
Geo. T. Smallwood.
Geo. McGovern

Inventor:
F. F. Atkinson.
By R. C. Mitchell
Atty.

UNITED STATES PATENT OFFICE.

FRANCIS F. ATKINSON, OF NEW YORK, N. Y.

ADJUSTABLE FEED-BAG.

SPECIFICATION forming part of Letters Patent No. 485,600, dated November 8, 1892.

Application filed October 29, 1891. Serial No. 410,184. (No model.)

*To all whom it may concern:*

Be it known that I, FRANCIS F. ATKINSON, a citizen of Great Britain, and a resident of New York city, in the county of New York and State of New York, have invented certain new and useful Improvements in Adjustable Feed-Bags for Horses, of which the following is a specification.

My invention relates to an improved feed-bag for horses.

The object of my invention is to so construct a feed-bag that it is possible for the horse to which it is attached to readily reach the entire contents of the feed-bag and also to enable the bag when not in use to be compressed into a small compass. To accomplish this object, I make use of the mechanism illustrated by the accompanying drawings, in which—

Figure 2:
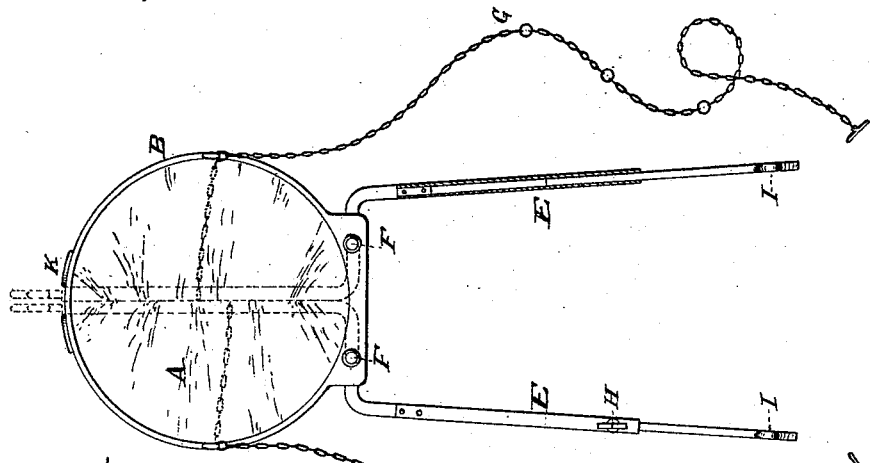
Figure 1:
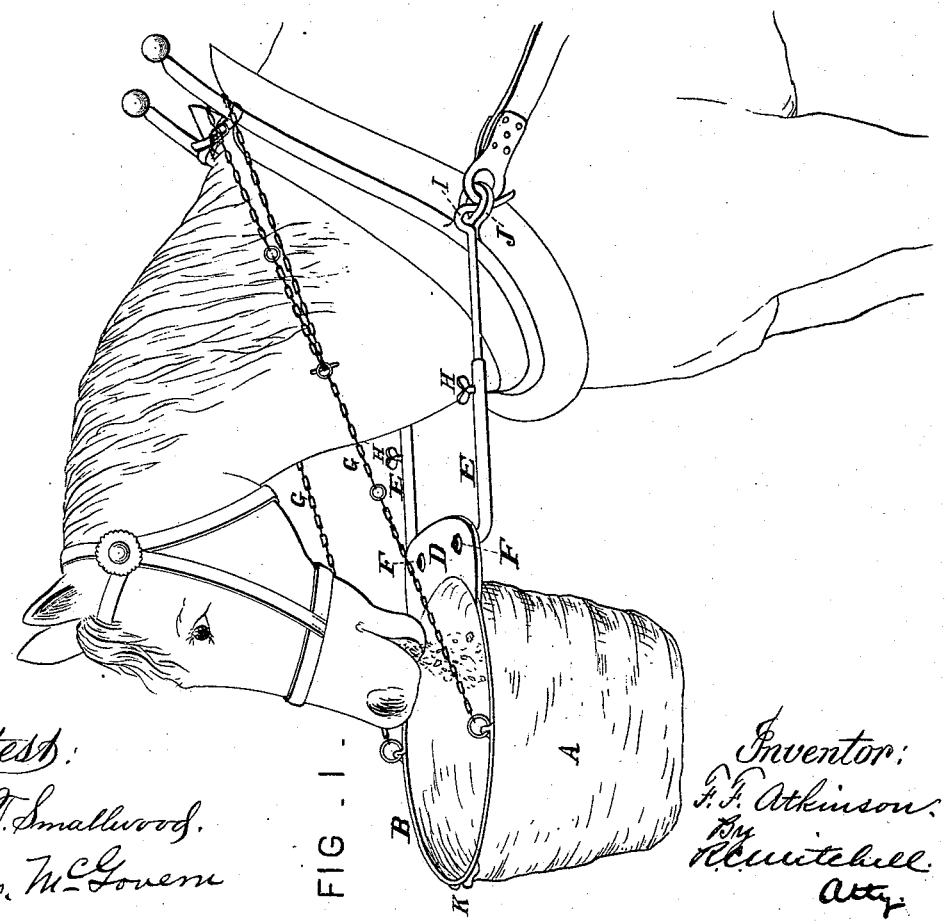

Figure 1 is a perspective side view of my improved feed-bag as attached to a horse; and Fig. 2 is a plan view of my improved feed-bag, showing in the solid lines its appearance when ready for adjusting and in the dotted lines the appearance of the device when out of use and folded.

Similar letters refer to similar parts in both figures.

A is the feed-bag proper, supported by a ring-shaped frame B. From one side of this frame projects a lug D. From this lug the arms E E, pivoted at F F, extend. At suitable points on the upper part of the frame B are fastened the chains or cords G G. The arms E E are preferably adjustable in their length. This may be accomplished by making the said arms telescopic and using a thumb-screw H. Any suitable means, however, may be used to vary the length of these arms. At the outer end of these arms E E a suitable hook I is formed to engage with the rings J, Fig. 1, on the hame portion of the horse-collar.

In operating my invention the arms E E are thrown into the position shown in Fig. 1 and the hooks I are caught into the rings J. The chains or cords G G are then slipped over the upper portion of the hame, as shown in Fig. 1. By varying the length of the arms E E the feed-bag A is moved forward or back, and by varying the length of cords G G the feed-bag is raised or lowered. In this manner the feed-bag may be placed in any desirable position under the horse's head. When the bag is not in use, the arms E E may be telescoped and swung around on the pivots F F to a position directly under the feed-bag frame B, as shown in Fig. 2 by the dotted lines. These arms E E may be retained in this position by a spring-clip K of ordinary construction. The arms E E may be bent in the manner shown in Fig. 2, so that when in the closed position they will entirely close the bag A, as shown by the dotted line in Fig. 2.

Having thus fully described my invention, what I claim, and desire to secure by Letters Patent, is—

1. A feed-bag provided with supporting chains or cords G G and the bent arms E E, pivoted to the bag-frame and adapted to horizontally swing and close the mouth of the feed-bag under the frame, substantially as described.

2. A feed-bag A, provided with supporting chains or cords G G and the telescopic arms E E, bent as described and pivoted to the bag-frame and adapted to swing horizontally and close the mouth of the feed-bag, as described.

3. A feed-bag A, provided with supporting chains or cords G G and the pivoted telescopic arms E E and the spring-clips K K, substantially as and for the purpose specified.

FRANCIS F. ATKINSON.

Witnesses:
R. C. MITCHELL,
FRED SCHLESINGER.